G. H. COATES.
FLEXIBLE SHAFTING.
APPLICATION FILED NOV. 24, 1917.
1,328,983.
Patented Jan. 27, 1920.
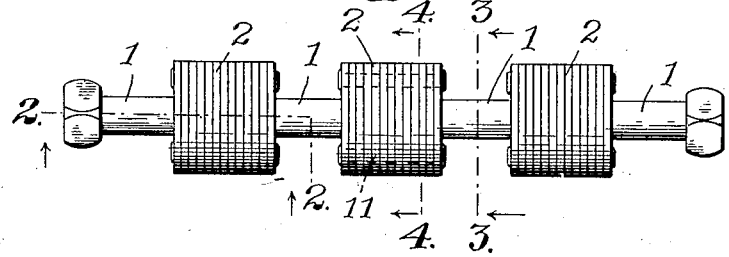
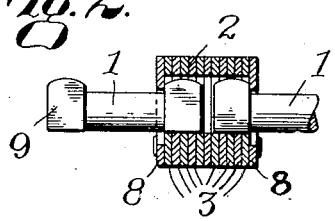
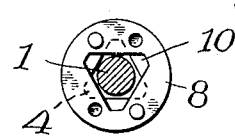
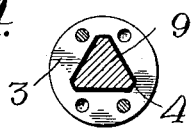
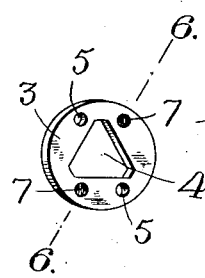
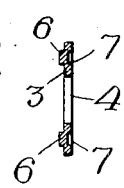
Inventor
George H. Coates.
By Attorneys
Fowler & Kennedy

UNITED STATES PATENT OFFICE.

GEORGE H. COATES, OF WORCESTER, MASSACHUSETTS.

FLEXIBLE SHAFTING.

1,328,983.  Specification of Letters Patent.  Patented Jan. 27, 1920.

Application filed November 24, 1917. Serial No. 203,806.

*To all whom it may concern:*

Be it known that I, GEORGE H. COATES, a citizen of the United States, residing at Worcester, in the county of Worcester and Commonwealth of Massachusetts, have invented a new and useful Improvement in Flexible Shafting, of which the following, together with the accompanying drawings, is a specification.

The present invention relates to flexible shafting of the type such as is used, for instance, in conjunction with speedometers and the like. The invention resides in an improved construction for such flexible shafting which is susceptible of ready and inexpensive manufacture, and which is easily assembled in any desired length. The invention contemplates a construction which is extremely durable, and one which may be readily and cheaply repaired in the event of breakage or wear in any of its parts.

The above and other objects are attained by the construction which is herein described, reference being had in this connection to the accompanying drawings, in which—

Figure 1 is a plan view of a short section of flexible shafting constructed in accordance with my invention.

Fig. 2 is a sectional view on the line 2—2 of Fig. 1.

Fig. 3 is an end view of a section of shafting, as viewed from the section line 3—3, Fig. 1.

Fig. 4 is a sectional view on the line 4—4 of Figs. 1 and 2.

Fig. 5 is a perspective view of one of the disks or plates used in my improved construction, and Fig. 6 is a sectional view thereof on the line 6—6 of Fig. 5.

Like reference characters refer to like parts in the different figures.

As herein shown, my improved flexible shafting is constituted by a plurality of shaft sections 1, 1 and a plurality of coupling sections 2, 2, the latter being interposed between, and connecting, adjacent shaft sections 1, 1. Each coupling section 2 is composed of a plurality of flat disks or plates 3, one of which is shown in Fig. 5 as provided with a substantially triangular aperture or opening 4 therein. Each disk or plate 3 also preferably provides a pair of diametrically opposite holes 5, 5 therein for the passage of a pin or rivet to hold a plurality of such disks together. Said disks may be conveniently formed by stamping or by pressing from sheet metal, in the well known manner, and in said stamping or pressing operation, each disk is preferably also struck up on one surface to form projecting lugs 6, 6 with corresponding depressions 7, 7 on the opposite surface, as shown in Fig. 6.

In the construction of shafting according to my invention, a plurality of such disks 3, constructed as above described, is assembled, face to face, with their triangular openings 4, 4 in registration, and with the lugs 6, 6 of each disk entering the corresponding depressions 7, 7 of the next adjacent disk. Such an assemblage of disks 3, 3 is indicated in the sectional view of Fig. 2, where the eleven interior disks of the coupling member 2 therein shown, between the extreme outer disks 8, 8, are so assembled, with their triangular openings in registration.

Each shaft section 1 provides an enlargement 9 at each end, said enlargements being made substantially triangular in cross section, to conform at their points of greatest cross sectional area with the triangular openings 4 of disks 3. The side surfaces of said enlargements 9 are convex, as clearly shown in Figs. 1 and 2, the curvature thereof being such that the triangular cross section of each enlargement is greatest in area at its longitudinal center, and gradually reduces toward both ends, axially of the shaft section. At said region of greatest cross section, said enlargement 9 fits fairly snug within the triangular bore provided by the series of assembled disks 3, as shown in Fig. 1, but by virtue of the convexity of the side surfaces, as above described, a limited universal movement between a coupling member 2 and a shaft section 1 is permitted, the extent of said movement being dependent upon the radius of curvature of these side surfaces, as will readily be apparent.

Each matching or registering assemblage of disks 3, as shown in Fig. 2, is adapted to receive the adjacent triangular enlargements 9, 9 of a pair of shaft sections 1. Means are provided to prevent withdrawal of said enlargements 9, 9 once they have been inserted, as shown in Fig. 2, and these means preferably take the form of disks 8, 8, which are in all respects identical with the disks 3, 3. The disks 8, 8, however, before attachment to the assembled disks 3, are turned through approximately sixty degrees to carry their triangular openings out of registration with the openings 4 of disks 3. This arrangement is illustrated in Fig. 3, where the triangular opening 10 of the end disk 8 is shown in full lines, while the triangular opening 4 of the next adjacent disk 3 is shown partly in dotted lines. Said disks 8, 8 are fastened at each end of the assemblage of disks 3 by means of pins or rivets 11, or the like, passing through the holes 5, 5, and when so fastened, the withdrawal of the enlargements 9, 9 from the coupling member 2 is effectually prevented, since the apex portions of said triangular enlargements lie adjacent the sides of triangular openings 10.

It will be obvious that with flexible shafting constructed as above described, the required amount of universal movement between each pair of adjacent sections 1, 1 is easily secured, and the whole assemblage presents a construction in which all the parts are readily manufactured in large quantities, there being only two different kinds of parts in all, namely the shaft sections and the disks. It will be obvious that my invention is not confined to the precise construction herein shown and described, but that various changes and variations therein may be made within the scope of the appended claims.

I claim,

1. A flexible shafting comprising series of alternating shaft sections and coupling sections, each coupling section comprising a series of attached plates having registering openings.

2. A flexible shafting comprising series of alternating shaft sections and coupling sections, each coupling section comprising a series of attached plates having registering openings of angular shape.

3. A flexible shafting, comprising a series of alternating shaft sections and coupling sections, each coupling section comprising a series of attached plates each provided with a central angular opening to receive a similarly shaped enlargement on the end of a shaft section, and each of said attached plates having on one side a series of depressions and on the opposite a series of corresponding projections fitting the depression of an adjacent plate in order to hold said central angular openings in registration.

4. A flexible shafting comprising series of alternating shaft sections and coupling sections, each coupling section providing an opening of angular cross section to receive similarly shaped enlargements on the adjacent ends of a pair of shaft sections, and means at the ends of each coupling section for preventing withdrawal of said enlargements from said opening, said means comprising plates having similarly shaped openings arranged at an angle to said coupling section opening.

5. A flexible shafting comprising series of alternating shaft sections and coupling sections, each coupling section comprising a series of attached plates having registering openings of angular shape, and plates at the ends of said series of plates having similarly shaped openings arranged at an angle to the openings of said series of plates.

6. A flexible shafting comprising series of alternating shaft sections and coupling sections, each coupling section comprising a plurality of plates having triangular openings therein, the openings of a portion of said plates being in registration.

7. A flexible shafting comprising series of alternating shaft sections and coupling sections, each coupling section comprising a plurality of plates having triangular openings therein, the openings of a portion of said plates being in registration, and the openings of the other of said plates being at an angle to said registering openings.

GEORGE H. COATES.

Witnesses:
 PENELOPE COMBERBACH,
 NELLIE WHALEN.